United States Patent [19]

Zingheim

[11] 4,129,616

[45] Dec. 12, 1978

[54] POLYMERIC COMPOSITIONS CONTAINING BROMINATED FLAME RETARDANTS

[75] Inventor: Steven C. Zingheim, Mountain View, Calif.

[73] Assignee: Raychem Corporation, Menlo Park, Calif.

[21] Appl. No.: 828,731

[22] Filed: Aug. 29, 1977

Related U.S. Application Data

[63] Continuation-in-part of Ser. No. 806,676, Jun. 15, 1977, abandoned.

[51] Int. Cl.$^2$ .............................. C08J 3/24; C08J 5/00; C08F 255/02; C08L 23/06
[52] U.S. Cl. ....................... 260/878 R; 260/45.75 B; 260/45.95 G; 427/120; 428/462; 428/500
[58] Field of Search ................ 260/878 R, 45.75 B, 260/45.95 G; 427/120; 428/462, 500

[56] References Cited

U.S. PATENT DOCUMENTS

| | | | |
|---|---|---|---|
| 3,133,038 | 5/1964 | Hahn | 260/45.75 B |
| 3,250,739 | 5/1966 | Sauer et al. | 260/45.75 B |
| 3,285,965 | 11/1966 | Jenkner | 260/45.75 B |
| 3,806,555 | 4/1974 | Nagaoka et al. | 260/878 R |
| 3,816,564 | 6/1974 | Holliday et al. | 260/878 R |
| 3,817,851 | 6/1974 | Atchison et al. | 260/878 R |
| 3,957,722 | 5/1976 | Lawson et al. | 260/45.95 G |
| 3,974,132 | 8/1976 | Valdiserri | 260/878 R |
| 4,000,114 | 12/1976 | Gordon et al. | 260/45.95 G |

*Primary Examiner*—Alan Holler
*Attorney, Agent, or Firm*—Lyon & Lyon

[57] ABSTRACT

Peroxide cross-linked polymeric compositions containing brominated flame retardants have reduced water absorption if an unsaturated co-agent is used to reduce the amount of peroxide needed to effect cross-linking. This makes it possible to replace part or all of the chlorinated flame retardants conventionally used and yet to obtain cross-linked compositions which meet the IPCEA water absorption requirements and can therefore be used for insulating electrical wire and cable.

36 Claims, No Drawings

POLYMERIC COMPOSITIONS CONTAINING BROMINATED FLAME RETARDANTS

This application is a continuation-in-part of my application Ser. No. 806,676 filed June 15, 1977, now abandoned.

BACKGROUND TO THE INVENTION

1. Field of the Invention

This invention relates to polymeric compositions comprising bromine-containing flame retardants, and to their use, especially for insulating electrical components, particularly wire and cable.

2. Summary of the Prior Art

It is well-known to provide electrical wire and cable with an electrically insulating covering by coating the wire or cable with a polymeric composition which contains a chlorinated flame retardant, and an unsaturated compound which promotes cross-linking (a "co-agent"), and then cross-linking the coating by heat. While brominated flame retardants are also known, they have not been used in compositions which are cross-linked by peroxides, because the resulting cross-linked compositions have absorbed water too rapidly (in particular they have IPCEA water absorptions of greater than 3%) and therefore have unsatisfactory electrical characteristics.

SUMMARY OF THE INVENTION

I have now discovered that by increasing the amount of co-agent and reducing the amount of peroxide in cross-linkable polymeric compositions containing bromine-containing organic flame retardants, a very significant reduction in the water absorption of the resulting cross-linked compositions is obtained, and in particular that compositions meeting the accepted industry standards can readily be obtained.

In its first aspect, the invention provides a composition which can be cross-linked by heating and which comprises (a) a polymer which can be cross-linked with the aid of an organic peroxide;

(b) an organic peroxide;

(c) a compound which contains carbon-carbon unsaturation and which cooperates with said peroxide, when the composition is heated, to promote cross-linking of said polymer; and (d) a bromine-containing organic flame retardant; the ratio by weight of the unsaturated compound (c) to the peroxide (b) being at least 1.2:1.

In its second aspect, the invention provides a process for the production of a shaped article of a cross-linked polymer composition, which process comprises (1) melt-shaping a composition which comprises (a) a polymer which can be cross-linked with the aid of an organic peroxide;

(b) an organic peroxide;

(c) a compound which contains carbon-carbon unsaturation, which cooperates with said peroxide, when the composition is heated, to promote cross-linking of said polymer; and (d) a bromine-containing flame retardant said melt-shaping being carried out under conditions such that cross-linking of said composition is substantially prevented; and (2) heating said melt-shaped composition to effect cross-linking of the polymer; the absolute and relative amounts of said peroxide (b) and said compound (c) being such that the shaped article has an $M_{100}$ value of at least 40 and a change in capacitance over 14 days in the IPCEA Test No. S-66-524, NEMA WC 7, paragraph 6.6, of less than 3%.

In its third aspect the invention provides an article having a coating thereon comprising (i) a polymer which has been cross-linked with the aid of an organic peroxide and a compound which contains carbon-carbon unsaturation, and (ii) a bromine-containing organic flame retardant, said coating having a change in capacitance over 14 days in the IPCEA Test No. S-66-524, NEMA WC 7, paragraph 6.6, of less than 3%.

DETAILED DESCRIPTION OF THE PREFERRED EMBODIMENTS OF THE INVENTION

The polymers which can be used in the present invention include polymers of one or more olefins; polymers of one or more olefins with one or more copolymerisable ethylenically unsaturated monomers containing functional groups, such polymers preferably containing at least 50%, especially at least 80%, by weight of units derived from one or more olefins; and polymers of one or more ethylenically unsaturated monomers containing functional groups; and blends of one or more such polymers, such blends preferably containing at least 50%, especially at least 80%, by weight of units derived from one or more olefins. Particularly suitable olefins are α-mono-olefins, especially ethylene. Functional groups which may be present on ethylenically unsaturated monomers include acid groups e.g., carboxyl groups and carboxylate salt groups, ester groups, e.g., alkoxy carbonyl groups, alkyl carbonyloxy groups, and halogen atoms. The choice of polymer will, of course, depend upon the end use of the composition. When the composition is used to produce insulation on electrical wire or cable by extrusion coating, preferred compositions comprise a blend of a low density polyethylene and an ethylene/vinyl acetate copolymer, preferably containing 10 to 30% by weight of units derived from vinyl acetate, in a ratio by weight of polyethylene to copolymer of at least 30:70, e.g., 40:60 to 60:40. Particularly good results are obtained using a blend of about equal parts of a low density polyethylene and an ethylene/vinyl acetate copolymer. The compositions of the invention will generally contain at least 40%, preferably at least 50%, especially 50 to 80%, e.g. about 60%, by weight of the polymer.

The bromine-containing organic fire retardants used in this invention are preferably aromatic but may be aliphatic. The fire retardant should, of course, be one which will be effective even after the composition has been shaped and cross-linked by heating. Particularly good results have been obtained using decabromodiphenylether. This and other brominated compounds are known in the art as flame retardants. The flame retardant may be one which becomes at least in part chemically bonded to the polymer during the cross-linking. The amount of fire retardant will generally be at least 10%, preferably at least 15%, particularly at least 20%, by weight of the composition. Since excessive amounts of the fire retardant can cause poor physical properties, amounts in excess of 35% are generally avoided.

The compositions may contain other flame-retardants, for example, inorganic fire retardants, which may be present in substantial amount, e.g. up to 20%, preferably 5 to 15%, by weight of the composition. Especially useful are flame retardants which are known to demonstrate a synergistic effect with halogenated flame retardants, e.g., antimony compounds, especially $Sb_2O_3$. Chlorinated fire retardants may also be present, but the brominated fire retardant preferably provides 50 to 100% especially 80 to 100%, of the total weight of organic fire retardants in the composition.

The compositions may also contain other ingredients such as fillers, processing aids and stabilisers, for example acid scavengers such as lead fumarate (e.g., "Lectro 78") and free radical scavengers such as aromatic secondary amines (e.g., "Agerite Resin D"). The amount of such other ingredients will generally not exceed 10%, preferably 5%, by weight of compositions to be used for extrusion-coating as insulation onto wire or cable.

The organic peroxides used in this invention are those conventionally used in the art, the choice of peroxide being dependent inter alia on the temperature at which the composition is to be shaped (at which decomposition of the peroxide should be sufficiently slow not to interfere with the shaping operation) and the temperature (and, especially in a continuous process, the time) of the subsequent cross-linking step, during which rapid decomposition of the peroxide is desirable. The peroxides which can be used include dicumyl peroxide and 2,5-dimethyl-2,5-di-t-butylperoxyhexane.

The compounds (c) which contain carbon-carbon unsaturation and which cooperate with the peroxides to promote cross-linking are referred to herein as co-agents. The coagents which can be used are the compounds which have been widely used to promote cross-linking in irradiation cross-linking procedures. Generally they contain at least two ethylenic double bonds. Examples of suitable compounds are triallyl isocyanurate, pentaerythritol triacrylate and pentaerythritol tetraacrylate.

The higher the ratio of the co-agent to the peroxide, the less the water absorption of the cross-linked composition. The ratio by weight is preferably at least 1.2:1, particularly at least 1.5:1, especially at least 2.5:1. This ratio preferably does not exceed 7.5:1, in order to ensure an adequate amount of peroxide.

The total amount of peroxide and co-agent preferably employed is dependent on the cross-linking conditions and the degree of cross-linking required. This amount is generally 1 to 8%, preferably 2 to 5%, by weight of the composition.

The ingredients of the composition are thoroughly mixed together by any convenient method, taking care not to activate the peroxide. The composition is then shaped prior to being cross-linked. Shaping is preferably effected by melt extrusion or other melt-shaping method at a temperature at which decomposition of the peroxide is sufficiently slow that any cross-linking that takes place does not interfere with the shaping operation. Cross-linking is then effected, generally by raising the temperature. The temperatures employed in these steps will depend upon the polymer and the peroxide. In a preferred procedure, the composition is continuously melt-extruded through a cross-head die onto a wire, and is continuously cross-linked by passing the coated wire through an oven. Generally, the wire size is 1000 MCM to 20 AWG, preferably 2/0 to 16 AWG, and the coating has a thickness of 15–75 mils, preferably 20–50 mils. Especially for such use, the cross-linking should be effective to increase the $M_{100}$ modulus (measured as described below) of the composition to at least 30, generally at least 50, preferably at least 70, especially at least 80. On the other hand, the $M_{100}$ modulus will generally not exceed 200, since this can result in undesirably low elongations.

The invention is illustrated in the following Examples, in which parts are by weight.

EXAMPLE 1

In each of the Examples, the ingredients shown in the Table below were thoroughly mixed together by blending all the ingredients except the peroxide (B) and the co-agent (C) in a Banbury mixer at 290° F. (143° C.). In Examples 1–6 the peroxide (B) and the co-agent (C) were thoroughly mixed together with the other previously blended ingredients on a 3 inch two roller mill at 250° F. (120° C.). In Examples 7–10 the peroxide (B) and the co-agent (C) were thoroughly mixed together with the other previously blended ingredients in a Banbury mixer at 250° F. (120° C.).

In Examples 1–6, the mixture was pressed into a slab at 250° F. (120° C.), and the slab heated at 390° F. (200° C.) for 1 minute. The $M_{100}$ value of the cured slab material was measured using a ⅛ inch (0.3cm) wide strip cut from the slab. The water absorption of the cured slab material was also measured, using a disc cut from the slab. The results are shown in the Table.

In Examples 7–10, the mixture was extruded over a wire and then cured at 390° F. (200° C.) for 1 minute. The water absorption, capacitance change, stability factor and $M_{100}$ value of the coated wire were measured, and the results are shown in the Table.

In the Table, the Examples marked with an asterisk (*) are comparative Examples, and the various ingredients are as identified below:

A(1) is a low density polyethylene ("DYNH")
A(2) is an ethylene/vinylacetate (18%) copolymer (EVA 3170)
B(1) is dicumyl peroxide supported on $CaCO_3$ (40% peroxide) ("Di-cup"40C)
B(2) is 2,5-dimethyl-2,5-di-t-butylperoxyhexane ("Varox") (50% peroxide)
(C) is triallylisocyanurate (TAIC)
(D) is decabromodiphenylether ("DE 83")
(E) is $Sb_2O_3$
(F) is lead fumarate ("Lectro 78")
(G) is an aromatic secondary amine ("Agerite Resin D")
"Ratio", is the ratio of (C) to the peroxide content of (B).

The various properties given in the Table for the cured compositions were measured as follows:

$M_{100}$

The test specimen is suspended in a chamber maintained at 120° C. ± 2° C. and after it has equilibrated load is applied incrementally until the specimen has elongated 100%. The static modulus, $M_{100}$, is the slope of a plot of load vs. elongation at 100% elongation and is expressed in psi.

Abs(1)

Discs cut from the cured slabs of Examples 1–6 were weighed dry. They were then immersed in water at 70° C. for 65 hours, wiped dry and weighed again. The percent weight change was calculated and is reported as Abs(1).

Abs(2)

The weight increase of samples of the coated wires prepared in Examples 7–10 on exposure to water for seven days was measured by the procedure of IPCEA Publication No. S-19-81 NEMA WC3, paragraph 6.9.3 and is reported as Abs(2) in mg/sq. inch.

Cap 1-14, cap 7-14 and Stab

The change in capacitance on exposure to water of 5 samples of the wires prepared in Examples 7-10 was measured in accordance with the procedure of IPCEA Publication No. S-66-524, NEMA WC7, paragraph 6.6. The percent change after 14 days, based on the capacitance after one day, is reported as Cap 1-14, and the percent change between the seventh and fourteenth days, based on the capacitance after seven days, is reported as Cap 7-14. The stability factor was also calculated and is reported as Stab.

oxide, when the composition is heated, to promote cross-linking of said polymer;
(d) a bromine-containing organic flame retardant; and
(e) an inorganic flame retardant; said polymer (a) being present in amount 50 to 80% by weight of the composition; the total amount of said peroxide (b) and said unsaturated compound (c) being 1 to 8% by weight of the composition; the ratio by weight of said compound (c) to said peroxide (b) being from 1.5:1 to 7.5:1; said bromine-containing organic flame retardant (d) being present in amount 10 to 35% by weight of the composition and said inorganic flame retardant (e) being present in amount 5 to 15% by weight of the composition.

TABLE

| Example No. | A(1) | A(2) | B(1) | B(2) | C | D | E | F | G | Ratio | $M_{100}$ | Abs(1) | Abs(2) | Cap(1-14) | Cap(7-14) | Stab. |
|---|---|---|---|---|---|---|---|---|---|---|---|---|---|---|---|---|
| *1 | 30 | 30 | 3 |  | 0.4 | 25 | 10 | 1 | 1 | 0.33 | 55 | 0.44 |  |  |  |  |
| *2 | 30 | 30 |  | 3 | 0.4 | 25 | 10 | 1 | 1 | 0.27 | 57 | — |  |  |  |  |
| 3 | 30 | 30 | 2 |  | 1.4 | 25 | 10 | 1 | 1 | 1.75 | 97 | 0.26 |  |  |  |  |
| 4 | 30 | 30 |  | 2 | 1.4 | 25 | 10 | 1 | 1 | 1.4 | 76 | — |  |  |  |  |
| *5 | 30 | 30 | 2 |  | 0.4 | 25 | 10 | 1 | 1 | 0.5 | 43 | — |  |  |  |  |
| 6 | 30 | 30 | 1 |  | 2.4 | 25 | 10 | 1 | 1 | 6.0 | 91 | 0.065 |  |  |  |  |
| *7 | 29.8 | 29.8 | 3 |  | 0.4 | 25 | 10 | 1 | 1 | 0.33 | 64 | — | 12.5 | 4.9 | 1.7 | 0.8 |
| 8 | 29.8 | 29.8 |  | 3 | 0.4 | 25 | 10 | 1 | 1 | 0.26 | 71 | — | 10.0 | 2.7 | 1.2 | 1.1 |
| 9 | 30 | 30 | 1 |  | 2.0 | 25 | 10 | 1 | 1 | 5.0 | 78 | — | 3.9 | 0.4 | 0.6 | 0.2 |
| 10 | 30 | 30 |  | 1 | 2.0 | 25 | 10 | 1 | 1 | 4.0 | 78 | — | 3.7 | 1.2 | 0.7 | 0.2 |

I claim:

1. A composition which can be cross-linked by heating, and which comprises:
   (a) a polymer which can be cross-linked with the aid of an organic peroxide said polymer comprising at least 40% by weight of said composition;
   (b) an organic peroxide;
   (c) a compound which contains carbon-carbon unsaturation and which cooperates with said peroxide, when the composition is heated, to promote cross-linking of said polymer; and
   (d) a bromine-containing organic flame retardant said flame retardant being present in said composition in an amount not greater than 35% by weight; the ratio by weight of the unsaturated compound (c) to the peroxide (b) being at least 1.2:1.

2. A composition according to claim 1 wherein said flame retardant (d) is an aromatic compound.

3. A composition according to claim 1 wherein said flame retardant (d) provides 50 to 100% of the total weight of organic fire retardants in the composition.

4. A composition according to claim 3 wherein the ratio by weight of the unsaturated compound (c) to the peroxide (b) is at least 1.5:1.

5. A composition according to claim 4 wherein said ratio is at least 2.5:1.

6. A composition according to claim 1 which also contains an inorganic flame retardant.

7. A composition according to claim 1 wherein at least 80% by weight of the polymer consists of units obtained by polymerization from an α-monoolefin.

8. A composition according to claim 1 which can be melt-shaped and subsequently cross-linked by heating and which comprises:
   (a) a polymer which can be cross-linked with the aid of an organic peroxide and at least 80% by weight of which consists of units obtained by polymerization from an α-monoolefin;
   (b) an organic peroxide;
   (c) a compound which contains at least two ethylenic double bonds and which cooperates with said per- 9. A composition according to claim 8 wherein said polymer is selected from the group consisting of low density polyethylene and blends of low density polyethylene and ethylene/vinyl ester copolymers.

10. A composition according to claim 9 wherein said unsaturated compound (c) is triallyl isocyanurate.

11. A composition according to claim 9 wherein said bromine-containing flame retardant (d) is decabromodiphenyl ether.

12. A composition according to claim 9 wherein said inorganic flame retardant (e) is $SB_2O_3$.

13. A process for the production of a shaped article of a cross-linked polymer composition, which process comprises:
   (1) melt-shaping a composition which comprises:
      (a) a polymer which can be cross-linked with the aid of an organic peroxide said polymer comprising at least 40% by weight of said composition;
      (b) an organic peroxide;
      (c) a compound which contains carbon-carbon unsaturation, which cooperates with said peroxide, when the composition is heated, to promote cross-linking of said polymer; and
      (d) a bromine-containing flame retardant said flame retardant being present in said composition in an amount not greater than 35%; said melt-shaping being carried out under conditions such that cross-linking of said composition is substantially prevented; and
   (2) heating said melt-shaped composition to effect cross-linking of the polymer; the absolute and relative amounts of said peroxide (b) and said compound (c) being such that the shaped article has an IPCEA water absorption of less than 3% and an $M_{100}$ value of at least 40.

14. A process according to claim 13 wherein the ratio by weight of said compound (c) to said peroxide (b) is at least 1.2:1.

15. A process according to claim 14 wherein said ratio is at least 1.5:1.

16. A process according to claim 15 wherein said ratio is at least 2.5:1.

17. A process according to claim 13 wherein step (1) comprises melt-extruding said composition around an electrical wire or cable to form an electrically insulating coating thereon.

18. A process according to claim 17 wherein said composition comprises:
(a) a polymer which can be cross-linked with the aid of an organic peroxide and at least 80% by weight of which consists of units obtained by polymerization from an α-monoolefin;
(b) an organic peroxide;
(c) a compound which contains at least two ethylenic double bonds and which cooperates with said peroxide, when the composition is heated, to promote cross-linking of said polymer;
(d) a bromine-containing organic flame retardant; and
(e) an inorganic flame retardant; said polymer (a) being present in amount 50 to 80% by weight of the composition; the total amount of said peroxide (b) and said unsaturated compound (c) being 1 to 8% by weight of the composition; the ratio by weight of said compound (c) to said peroxide (b) being from 1.5:1 to 7.5:1; said bromine-containing organic flame retardant (d) being present in amount 10 to 35% by weight of the composition and said inorganic flame retardant (e) being present in amount 5 to 15% by weight of the composition.

19. A process according to claim 18 wherein said polymer is selected from the group consisting of low density polyethylene and blends of low density polyethylene and ethylene/vinyl ester copolymers.

20. A process according to claim 19 wherein said unsaturated compound (c) is triallyl isocyanurate.

21. A process according to claim 19 wherein said bromine-containing flame retardant (d) is decabromodiphenyl ether.

22. A process according to claim 19 wherein said inorganic flame retardant (e) is $Sb_2O_3$.

23. A process according to claim 19 wherein said organic peroxide is dicumyl peroxide.

24. A process according to claim 13 wherein the shaped article has an $M_{100}$ value of at most 200.

25. An article having a coating thereon comprising (i) a polymer which has been cross-liked with the aid of an organic peroxide and a compound which contains carbon-carbon unsaturation, said polymer comprising at least 40% by weight of said coating, and (ii) a bromine-containing organic flame retardant said flame retardant being present in said coating in an amount not greater than 35%, said coating having an IPCEA water absorption of less than 3%.

26. An article according to claim 25 which is an electrical component which is electrically insulated by said coating and wherein said coating has an $M_{100}$ value of at least 50.

27. An article according to claim 26 which is an electrical wire or cable.

28. An article according to claim 27 wherein said coating has an $M_{100}$ value of at most 200.

29. An article according to claim 25 wherein the coating also contains an inorganic flame retardant.

30. An article according to claim 29 wherein the coating contains 10 to 35% by weight of the coating of the bromine-containing flame retardant and 5 to 15% by weight of the inorganic flame retardant.

31. An article according to claim 30 wherein the bromine-containing flame retardant is decabromo diphenyl ether and the inorganic flame retardant is $Sb_2O_3$.

32. A process according to claim 31 wherein said shaping step (1) comprises melt-extruding said composition around an electrical wire or cable.

33. A composition which can be cross-linked by heating, and which comprises:
(a) a polymer which can be cross-linked with the aid of an organic perioxide said polymer comprising at least 40% by weight of said composition;
(b) an organic peroxide;
(c) a compound which contains carbon-carbon unsaturation and which cooperates with said peroxide, when the composition is heated, to promote cross-linking of said polymer; and
(d) a bromine-containing organic flame retardant said flame retardant being present in said composition in an amount not greater than 35% by weight; the ratio by weight of the unsaturated compound (c) to the peroxide (b) being at least 1.2:1 but not greater than 7.5:1, the total amount of said compounds (b) and (c) present in the composition being not greater than 8% by weight.

34. A process according to claim 13 wherein the ratio by weight of said compound (c) to said peroxide (b) is at least 1.2:1 but not greater than 7.5:1.

35. A process according to claim 34 wherein said ratio is at least 1.5:1 but not greater than 7.5:1.

36. A process according to claim 35 wherein said ratio is at least 2.5:1 but not greater than 7.5:1.

* * * * *